United States Patent
Fukazawa et al.

(10) Patent No.: US 11,332,599 B2
(45) Date of Patent: May 17, 2022

(54) MODIFIED ZIRCONIUM PHOSPHATE TUNGSTATE, NEGATIVE THERMAL EXPANSION FILLER AND POLYMER COMPOSITION

(71) Applicant: NIPPON CHEMICAL INDUSTRIAL CO., LTD., Tokyo (JP)

(72) Inventors: Junya Fukazawa, Tokyo (JP); Toru Hata, Tokyo (JP); Takuma Kato, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 17/435,139

(22) PCT Filed: Feb. 28, 2020

(86) PCT No.: PCT/JP2020/008453
§ 371 (c)(1),
(2) Date: Aug. 31, 2021

(87) PCT Pub. No.: WO2020/179703
PCT Pub. Date: Sep. 10, 2020

(65) Prior Publication Data
US 2022/0041841 A1    Feb. 10, 2022

(30) Foreign Application Priority Data

Mar. 7, 2019 (JP) .............................. JP2019-041281
Dec. 18, 2019 (JP) .............................. JP2019-228647

(51) Int. Cl.
| | | |
|---|---|---|
| *C08K 9/06* | (2006.01) | |
| *C08K 9/02* | (2006.01) | |
| *C09C 1/00* | (2006.01) | |
| *C09C 3/06* | (2006.01) | |
| *C09C 3/12* | (2006.01) | |

(52) U.S. Cl.
CPC .................. *C08K 9/06* (2013.01); *C08K 9/02* (2013.01); *C09C 1/00* (2013.01); *C09C 3/063* (2013.01); *C09C 3/12* (2013.01); *C01P 2002/54* (2013.01); *C01P 2004/61* (2013.01); *C01P 2004/62* (2013.01); *C01P 2004/64* (2013.01); *C01P 2004/80* (2013.01); *C01P 2006/12* (2013.01); *C01P 2006/32* (2013.01); *C08K 2201/005* (2013.01); *C08K 2201/006* (2013.01)

(58) Field of Classification Search
CPC ...... C08K 9/06; C08K 9/02; C08K 2201/005; C08K 2001/006; C09C 1/00; C09C 3/063; C09C 3/12; C01P 2002/54; C01P 2004/61; C01P 2004/62; C01P 2004/64; C01P 2004/80; C01P 2006/12; C01P 2006/32
USPC ....................................................... 523/209
See application file for complete search history.

(56) References Cited

U.S. PATENT DOCUMENTS

| 10,280,086 B2 * | 5/2019 | Fukazawa ......... C04B 35/62655 |
| 2004/0063815 A1 | 4/2004 | Kinose et al. |
| 2018/0251376 A1 | 9/2018 | Fukazawa et al. |

FOREIGN PATENT DOCUMENTS

| JP | 2002-173614 A | 6/2002 |
| JP | 2004-51402 A | 2/2004 |
| JP | 2005-35840 A | 2/2005 |
| JP | 2006-137635 A | 6/2006 |
| JP | 2012-171813 A | 9/2012 |
| JP | 2015-10006 A | 1/2015 |
| JP | 2015-38197 A | 2/2015 |
| JP | 2016-113608 A | 6/2016 |
| JP | 2016-175796 A | 10/2016 |
| JP | 2017-88642 A | 5/2017 |
| JP | 2017-105659 A | 6/2017 |
| WO | 2017/061403 A1 | 4/2017 |

OTHER PUBLICATIONS

English Translation of JP 2006-137635. (Year: 2006).*
English Translation of WO 2019087722. (Year: 2019).*
International Search Report dated Apr. 14, 2020, issued in counterpart International Application No. PCT/JP2020/008453 (3 pages).
Decision to Grant a Patent dated Jun. 29, 2021, issued in counterpart JP Patent Application No. 2019-228647, w/English translation (5 pages).

* cited by examiner

Primary Examiner — Hannah J Pak
(74) Attorney, Agent, or Firm — WHDA, LLP (57) ABSTRACT

There is provided a modified zirconium phosphate tungstate which effectively suppresses the elution of phosphorus ions even when it contacts with water, can develop the performance excellent as a negative thermal expansion material, and can be dispersed in a polymer compound such as a resin, and use of which enables a low-thermal expansive material containing a negative thermal expansion filler to be well produced. The surface of a zirconium phosphate tungstate particle is coated with an inorganic compound containing one or two or more elements (M) selected from Zn, Si, Al, Ba, Ca, Mg, Ti, V, Sn, Co, Fe and Zr. The BET specific surface area of the zirconium phosphate tungstate particle is preferably 0.1 m²/g to 50 m²/g.

13 Claims, 3 Drawing Sheets

MODIFIED ZIRCONIUM PHOSPHATE TUNGSTATE, NEGATIVE THERMAL EXPANSION FILLER AND POLYMER COMPOSITION

TECHNICAL FIELD

The present invention relates to a modified zirconium phosphate tungstate, and a negative thermal expansion filler and a polymer composition using the same.

BACKGROUND ART

Substances usually have such a property that, with increased temperature, their length and volume increase due to thermal expansion. On the other hand, materials exhibiting negative thermal expansion (hereinafter, referred to as "negative thermal expansion materials" in some cases) are known which have such a property that their volume conversely becomes small by applying heat. The materials exhibiting negative thermal expansion are used, for example, together with other materials, to suppress the volume change by thermal expansion of materials due to the temperature change.

Examples of known materials exhibiting negative thermal expansion include β-eucryptite, zirconium tungstate ($ZrW_2O_8$), zirconium phosphate tungstate ($Zr_2WO_4(PO_4)_2$), $Zn_xCd_{1-x}(CN)_2$, manganese nitride and bismuth.nickel.iron oxides.

The zirconium phosphate tungstate particle has a linear expansion coefficient in the temperature range of 0 to 400° C. of −3.4 to −3.0 ppm/° C., and is known to have a large negative thermal expansion. By concurrently using the zirconium phosphate tungstate particle and a material exhibiting positive thermal expansion (hereinafter, referred to also as "positive thermal expansion material" in some cases), a low-thermal expansion material can be produced (see Patent Literatures 1 to 3). There is proposed also concurrent use of a polymer compound such as a resin being a positive thermal expansion material with a negative thermal expansion material (Patent Literatures 4 and 5).

CITATION LIST

Patent Literature

Patent Literature 1: Japanese Patent Laid-Open No. 2005-35840
Patent Literature 2: Japanese Patent Laid-Open No. 2015-10006
Patent Literature 3: International Publication No. WO2017/61403
Patent Literature 4: Japanese Patent Laid-Open No. 2015-38197
Patent Literature 5: Japanese Patent Laid-Open No. 2016-113608

The zirconium phosphate tungstate, however, when contacting with water, brings about elution as ions of phosphorus and the like in its structure, and this causes such problems as the reduction of the performance as a negative thermal expansion material, the reduction of the electric reliability in the case of being mixed with a material such as a resin and made into a resin molded article, and the corrosion of metal parts contacting with the resin molded article.

SUMMARY OF INVENTION

Technical Problem

Therefore, an object of the present invention is to provide a modified zirconium phosphate tungstate which can suppress elution of phosphorus ions in zirconium phosphate tungstate into water and can be suitably used as a negative thermal expansion filler to be contained in a polymer compound, and a negative thermal expansion filler and a polymer composition using the same.

Solution to Problem

As a result of exhaust studies in consideration of the above problem, the present inventors have found that by coating and modifying the surface of a zirconium phosphate tungstate particle with an inorganic compound containing a specific element, even when contacting with water, the elution of phosphorus ions can be effectively suppressed. It has been also found that by dispersing the modified zirconium phosphate tungstate in a polymer compound such as a resin, a low-thermal expansive material containing a negative thermal expansion filler can be produced to complete the present invention.

That is, the present invention provides a modified zirconium phosphate tungstate, in which the surface of a zirconium phosphate tungstate particle is coated with an inorganic compound containing one or two or more elements (M) selected from Zn, Si, Al, Ba, Ca, Mg, Ti, V, Sn, Co, Fe and Zr.

The present invention also provides a negative thermal expansion filler comprising the modified zirconium phosphate tungstate.

The present invention further provides a polymer composition comprising the negative thermal expansion filler and a polymer compound.

Advantageous Effects of Invention

According to the modified zirconium phosphate tungstate of the present invention, even when contacting with water, the elution of phosphorus ions is effectively suppressed and the performance excellent as a negative thermal expansion material can be developed. Further, the modified zirconium phosphate tungstate of the present invention can be dispersed in a polymer compound such as a resin, and a low-thermal expansive material containing a negative thermal expansion filler can well be produced.

DESCRIPTION OF EMBODIMENTS

Hereinafter, the present invention will be described based on preferred embodiments. The modified zirconium phosphate tungstate (hereinafter, referred to also as "modified ZWP") of the present invention is a zirconium phosphate tungstate particle (hereinafter, referred to also as "ZWP particle") whose surface is coated with an inorganic compound (hereinafter, referred to as "inorganic compound" in some cases) containing one or two or more elements (M) selected from Zn, Si, Al, Ba, Ca, Mg, Ti, V, Sn, Co, Fe and Zr. That is, the modified ZWP of the present invention is constituted of a particle in which a layer composed of the inorganic compound is formed on the surface of the ZWP particle as a core material. In the following description, the case of description as "N1 to N2" (N1 and N2 are each an arbitrary number) means, unless otherwise specified, "N1 or more and N2 or less".

The entire surface of the ZWP particle may be coated all over and continuously with the inorganic compound contained in the modified ZWP, or only part of the surface of the particle may be coated. In the former case, the modified ZWP is coated completely with the inorganic compound on the surface entire region, and is in the state that no surface of the particle is exposed. In the latter case, the modified ZWP is constituted of regions whose surfaces are composed of zirconium phosphate tungstate being a substrate and regions composed of the inorganic compound. In the case where the inorganic compound coats only part of the surface of the ZWP particle, the coated regions may be continuous, or may be discontinuous like sea islands, or may be in a combination thereof.

The zirconium phosphate tungstate constituting the ZWP particle in the present invention is represented by the following general formula (1).

$$Zr_x(WO_4)_y(PO_4)_z \quad (1)$$

wherein x is 1.7≤x≤2.3, preferably 1.8≤x≤2.2; y is 0.85≤y≤1.15, preferably 0.90≤y≤1.10; and z is 1.7≤z≤2.3, preferably 1.8≤z≤2.2.

The inorganic compound with which the ZWP particle to be used in the present invention is coated is an inorganic compound containing one or two or more elements (M) selected from Zn, Si, Al, Ba, Ca, Mg, Ti, V, Sn, Co, Fe and Zr. Examples of the inorganic compounds include an oxide, a hydroxide, a carbonate, a nitrate, a sulfate, and a silicate containing the element (M), and these inorganic compounds can be used singly or in combinations of two or more. Among these, an oxide or a hydroxide containing the element (M) is preferable from the viewpoints of being insoluble particularly in water and having a large effect of suppressing elution of phosphorus ions.

As the element (M), among these, Zn, Al, Ca and Ba are preferable and an inorganic compound containing Zn is especially preferable. This is because a film of the compound containing Zn effectively suppresses contact of ZWP with water and the compound is excellent also in adsorption performance of phosphorus ions, therefore, phosphorus ions eluted from ZWP are adsorbed by the compound containing Zn in the film to effectively suppress elution of phosphorus ions from the modified ZWP.

The inorganic compound may be a composite oxide, a composite hydroxide or a composite salt containing two or more of the element (M).

In the modified ZWP of the present invention, the coating amount (presence) of the inorganic compound in terms of the element (M) contained in the inorganic compound with respect to the ZWP particle is preferably 0.1% by mass to 10% by mass, more preferably 0.3% by mass to 5.0% by mass and still more preferably 0.5% by mass to 3.0% by mass. With the coating amount in such a range, the elution of phosphorus ions from the modified ZWP is effectively suppressed, enabling the performance as a negative thermal expansion material to be enhanced, and in use as a negative thermal expansion filler, the dispersibility in a positive thermal expansion material such as a resin becomes good.

When the element (M) is Zn, Si, Al, Ba, Ca, Mg, Ti, V, Sn, Co or Fe, on condition that these elements are not contained in the ZWP particle, the coating amount of the inorganic compound can be determined by subjecting a solution of the modified ZWP dissolved in nitric acid, hydrochloric acid or the like to ICP atomic emission spectrometry and measuring the amounts of elements selected from Zn, Si, Al, Ba, Ca, Mg, Ti, V, Sn, Co and Fe. Sub-component elements contained in the ZWP particle and inorganic elements coating the ZWP particle can be differentiated and quantitatively determined by using methods such as SEM-EDX and EPMA.

From the viewpoint of improving the dispersibility and the filling property into the positive thermal expansion material, it is preferable that the ZWP particle to be a raw material contains elements (hereinafter, referred to also as "sub-component elements") other than P, W, Zr and O, which are elements contained in the general formula (1).

Examples of the sub-component elements include alkaline metal elements such as Li, Na and K, alkaline earth metal elements such as Mg, Ca, Sr and Ba, transition metal elements such as Ti, V, Cr, Mn, Fe, Co, Ni, Cu, Y, Nb, Mo, Ag, Hf and Ta, rare earth elements such as La, Ce, Nd, Sm, Eu, Tb, Dy, Ho and Yb, other metal elements other than transition metal such as Al, Zn, Ga, Cd, In, Sn, Pb and Bi, semimetal elements such as B, Si, Ge, Sb and Te, non-metal elements such as S, and halogen elements such as F, Cl, Br and I. One or two or more of these elements may be contained in the particle. Among these, from the viewpoint of further improving the dispersibility and the filling property into the positive thermal expansion material, it is preferable that the particle contains at least one of sub-component elements of Mg, Al and V.

From the viewpoint of making the ZWP have excellent negative thermal expansion and be excellent in dispersibility and filling property into the positive thermal expansion material, the content of the sub-component elements in the ZWP particle is preferably 0.1% by mass to 3% by mass and more preferably 0.2% by mass to 2% by mass with respect to the ZWP particle. In the case where two or more of the sub-component elements are contained, the content of the sub-component elements is calculated based on the total mass of the sub-component elements. The content of the sub-component elements in the modified ZWP can be made to be in the same range as described above. The content of the sub-component elements can be measured by using a measuring apparatus, for example, an X-ray fluorescence analyzer and by a method such as a power press method or a molten glass bead method.

The particle shape of the modified ZWP is not especially limited, and may be, for example, spherical, granular, plate-like, flaky, whisker-like, rod-like, filament-like, a shape of irregular crushed stone having one or two or more ridgelines (referred to also as "crushed shape"), or a combination thereof.

According to the modified zirconium phosphate tungstate of the present invention in which the surface of the zirconium phosphate tungstate particle is coated with an inorganic compound containing one or two or more elements (M) selected from Zn, Si, Al, Ba, Ca, Mg, Ti, V, Sn, Co, Fe and Zr, even in the case where the modified zirconium phosphate tungstate contacts with water, the elution as ions of phosphorus from zirconium phosphate tungstate can be effectively suppressed and the excellent performance as a negative thermal expansion material can be developed. Further the modified zirconium phosphate tungstate of the present invention can be dispersed homogeneously in a polymer compound such as a resin, and consequently, a low-thermal expansive material can well be produced.

Hereinafter, a suitable production method of the modified ZWP of the present invention will be described. The production method of the modified ZWP is divided broadly into two steps of a step of reacting a zirconium source, a tungsten source and a phosphorus source to thereby obtain a ZWP particle, and a step of coating the surface of the obtained ZWP particle with an inorganic compound.

First, a zirconium source, a tungsten source and a phosphorus source are reacted to thereby obtain a ZWP particle. A production method of the ZWP particle to be used in the present invention is not especially limited, and examples thereof include (i) a method of firing a mixture obtained by mixing zirconium phosphate, tungsten oxide and a reaction promoter such as MgO in a wet ball mill (for example, see Japanese Patent Laid-Open No. 2005-35840), (ii) a method of wet mixing a zirconium source such as zirconium chloride, a tungsten source such as ammonium tungstate, and a phosphorus source such as ammonium phosphate, and firing the obtained mixture (for example, see Japanese Patent Laid-Open No. 2015-10006), (iii) a method of firing a mixture containing zirconium oxide, tungsten oxide and ammonium dihydrogen phosphate (for example, see Materials Research Bulletin, 44 (2009), pp. 2045-2049), and (iv) a method of preparing, as a reaction precursor, a mixture of a tungsten compound and an amorphous compound containing phosphorus and zirconium, and firing the reaction precursor (for example, see International Publication No. WO2017/061402).

From the viewpoint of making easy the handleability when the modified ZWP is used as a filler for the positive thermal expansion material, a BET specific surface area of the ZWP particle is preferably 0.1 $m^2/g$ to 50 $m^2/g$ and more preferably 0.1 $m^2/g$ to 20 $m^2/g$. The BET specific surface area of the modified ZWP can be made to be in the same range as above. The BET specific surface area is measured by one point method for BET method and can be measured, for example, by using a BET specific surface area analyzer (AUTOSORB-1, manufactured by Quantachrome Instruments Co., Ltd.).

From the similar viewpoint, an average particle diameter of the ZWP particles is preferably 0.02 µm to 50 µm and more preferably 0.5 µm to 30 µm. The average particle diameter of the modified ZWP can be made to be in the same range as above. With regard to the average particle diameter, any 100 particles are observed by using a scanning electron microscope and the average particle diameter can be determined as an arithmetic average value of the maximum lengths of the particles in the scanning electron microscope image. The maximum length used here refers to a length of the longest line segment among line segments crossing an image of a particle. The observation magnification is preferably so regulated that the number of particles present in one visual field is 100 to 200.

The particle shape of the ZWP particle is not especially limited, and may be, for example, spherical, granular, plate-like, flaky, whisker-like, rod-like, filament-like, crushed shape or a combination thereof. The ZWP particle may be a granule or a non-granulated powder.

From the viewpoint that the above-mentioned various properties such as the particle diameter, the specific surface area and the particle shape are easily controlled by an industrially advantageous method, and the modified ZWP excellent in negative thermal expansion is obtained, in the production method of the ZWP particle, it is preferable to use the ZWP particle produced by the method (iv).

Then, the surface of the ZWP particle obtained by the above-mentioned method is coated with an inorganic compound. The present step can be carried out by a wet process or a dry process.

In the case where the coating with the inorganic compound is carried out by the wet process, the target modified ZWP can be obtained, for example, by making a dispersion liquid (including a solution) containing the inorganic compound in a desired concentration contain the ZWP particle to thereby form a slurry, spray drying or solid-liquid separating the slurry, and drying an obtained solid content. The content of the inorganic compound in the dispersion liquid (including a solution) may be suitably regulated so that the coating amount of the inorganic compound in the modified ZWP falls in the above-mentioned range. The concentration of the inorganic compound in the dispersion liquid (including a solution) may be suitably regulated in consideration of workability.

In the case where the coating with the inorganic compound is carried out by the dry process, the target modified ZWP can be obtained, for example, by mixing the ZWP particle and a solid of the inorganic compound by using a mixing apparatus such as a Henschel mixer or a pneumatic crusher, or mixing the ZWP particle and a diluted solution of the inorganic compound diluted with a solvent, and thereafter, as required, heat drying the mixture. In the dry process, since the modified ZWP is produced by using the mixture, as it is, of the ZWP particle with the inorganic compound, the amount of the inorganic compound charged and the coating amount thereof are substantially the same.

The coating method using the dry process or the wet process may be a method of using an organic compound or an inorganic salt containing the element (M) to be a precursor of the inorganic compound, and heating the organic compound or the inorganic salt to a temperature equal to or higher than the decomposition temperature thereof by a heat treatment described later to convert the organic compound or the inorganic salt to an oxide. The organic compound is not especially limited as long as being one capable of being converted to an oxide by a heat treatment, and examples thereof include carboxylate of the element (M) and alkoxide of the element (M). A carboxylic acid of the carboxylate may be either one of a monovalent carboxylic acid and a polyvalent carboxylic acid, and examples thereof include acetic acid, citric acid, gluconic acid, formic acid and lactic acid. Examples of the inorganic salts include nitrate and carbonate of the element (M). The amount of the organic compound or the inorganic salt used may be suitably regulated so that the coating amount of the inorganic compound in the modified ZWP falls in the above-mentioned range.

Further in the case where the coating with the inorganic compound is carried out by the wet process, the coating method may also be a method of adding a water-soluble inorganic salt containing the element (M) and an alkali agent to a slurry of the ZWP particle dispersed in water and regulating the pH to 6 to 10 to thereby cause a hydroxide containing the element (M) to deposit on the surface of the ZWP particle. The content of the water-soluble inorganic salt containing the element (M) in the slurry may be suitably regulated so that the coating amount of the inorganic compound in the modified ZWP falls in the above-mentioned range.

The modified ZWP of the present invention thus produced suppresses the elution of phosphorus ions from the modified ZWP even in the presence of water and is suitably used as a negative thermal expansion material. In the modified ZWP of the present invention, the amount of phosphorus ions eluted when 1 g of the modified ZWP is heated in 70 mL of water at 85° C. for 1 hour, then cooled to 25° C. and allowed to stand for 24 hours is 100 μg or smaller and preferably 70 μg or smaller per g of the modified zirconium phosphate tungstate. The amount of phosphorus ions is measured as a total amount of phosphorus present in an eluate obtained by being allowed to stand for 24 hours as above, and can be measured, for example, by using an ICP atomic emission spectrometer.

Even in the case where the coating is carried out by either one of the wet process and the dry process, it is preferable to carry out further a heat treatment after the coating. The temperature of the heat treatment is preferably 250° C. to 600° C. and more preferably 300° C. to 450° C.; and the time of the heat treatment is preferably 30 min or longer and more preferably 1 hour to 10 hours. The atmosphere in the heat treatment may be any of vacuum, an inert gas atmosphere and an air atmosphere. By carrying out the heat treatment, the inorganic compound present on the surface of the ZWP particle forms a compact structure, and the elution of phosphorus ions from the modified ZWP in the presence of water is more suppressed. Consequently, the modified ZWP excellent in negative thermal expansion can be obtained.

The organic compound containing the element (M) and the inorganic salt containing the element (M) to be a precursor of the inorganic compound can be converted to an oxide of the element (M) by the heat treatment. The converted oxide of the element (M) present on the surface of the ZWP particle forms a compact structure, and the elution of phosphorus ions from the modified ZWP in the presence of water is more suppressed. Consequently, the modified ZWP excellent in negative thermal expansion can be obtained.

In the case of carrying out the heat treatment, and in the case of using compounds other than the oxide and the hydroxide as the inorganic compound containing the element (M), or using the organic compound containing the element (M), it is especially preferable that the temperature of the heat treatment is a temperature higher than the decomposition temperature of these compounds. Here, in the case of a salt hydrate, the decomposition temperature refers to a temperature at which the salt hydrate turns to an oxide. By carrying out the heat treatment at such a temperature, a compound containing the element (M) of a coating layer present on the surface of the ZWP particle is converted to an oxide, and along therewith, the coating layer present on the surface of the ZWP particle forms a more compact structure and the elution of phosphorus ions from the modified ZWP in the presence of water is more suppressed.

With the aim of further suppressing the elution of phosphorus ions from ZWP and more improving the dispersibility and the adhesiveness to a polymer compound, and with the aim of preventing reduction of the electric reliability of resin molded articles and corrosion of metal parts caused by the elution of phosphorus ions, the surface of the particle of the modified ZWP of the present invention can be further surface treated with a hydrophobic compound. Examples of the hydrophobic compounds include a coupling agent, a higher fatty acid, and a metal salt of higher fatty acid; and among these, a coupling agent is preferable in that the elution of phosphorus ions from ZWP can be more reduced and the effect of more improving the dispersibility and the adhesiveness to the polymer compound is high.

Hereinafter, the modified zirconium phosphate tungstate, in which the surface of the zirconium phosphate tungstate particle is coated with an inorganic compound containing one or two or more elements (M) selected from Zn, Si, Al, Ba, Ca, Mg, Ti, V, Sn, Co, Fe and Zr, is referred to as "modified ZWP(1)" for convenience in some cases.

Hereinafter, the modified zirconium phosphate tungstate, in which the surface of the modified ZWP(1) particle is further coated with a coupling agent, is referred to as "modified ZWP(2)" in some cases.

Examples of the coupling agents can be used for the modified ZWP(2) include silane coupling agents, aluminum coupling agents, titanate coupling agents and zirconate coupling agents; and these coupling agents can be used singly or in combinations of two or more.

Examples of the silane coupling agents include silazanes such as hexamethyldisilazane, hydrosilanes such as trimethylsilane, halosilanes such as trimethylchlorosilane, dimethyldichlorosilane, methyltrichlorosilane, allyldimethylchlorosilane and benzyldimethylchlorosilane, alkylalkoxysilanes such as methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-hexadecyltrimethoxysilane and n-octadecyltrimethoxysilane, vinylalkoxysilanes such as vinyltrimethoxysilane and vinyltriethoxysilane, methacryloyl group-containing alkoxysilanes such as γ-methacryloxypropyltrimethoxysilane and γ-methacryloxypropylmethyldimethoxysilane, amino group-containing alkoxysilanes such as γ-(2-aminoethyl) aminopropyltrimethoxysilane, γ-(2-aminoethyl)aminopropylmethyldimethoxysilane, γ-aminopropyltriethoxysilane, N-(2-aminoethyl)3-aminopropyltrimethoxysilane and N-β-(N-vinylbenzylaminoethyl)-γ-aminopropyltrimethoxysilane, epoxy group-containing alkoxysilanes such as β-(3,4-epoxycyclohexyl)ethyltrimethoxysilane, γ-glycidoxypropyltrimethoxysilane, γ-glycidoxypropylmethyldimethoxysilane and γ-glycidoxypropyltriethoxysilane, and vinyltriacetoxysilane, γ-chloropropyltrimethoxysilane, γ-mercaptopropyltrimethoxysilane, N-β-(aminoethyl)-γ-aminopropyltrimethoxysilane, γ-ureidopropyltriethoxysilane and aminofluorosilanes.

Examples of the aluminum coupling agents can include aluminum alcoholates such as ethylacetoacetatoaluminium diisopropylate, methylacetoacetatoaluminium diisopropylate, ethylacetatoaluminium dibutylate and alkylacetoacetatoaluminium diisopropylates, and aluminum chelates such as aluminium monoacetylacetate bis(ethylacetoacetate).

Examples of the titanate coupling agents include alkoxytitanium esters such as isopropyl triisostearoyltitanate, isopropyl tridodecylbenzenesulfonyltitanate, isopropyl tris(dioctylpyrophosphato)titanate, tetraisopropyl (dioctyl phosphite) titanate, tetraoctyl bis(ditridecyl phosphite) titanate, tetra(2,2-diallyloxymethyl-1-butyl) bis(ditridecyl) phosphite titanate, bis(dioctylpyrophosphato)oxyacetate titanate and bis(dioctylpyrophosphato)ethylene titanate.

Examples of the zirconate coupling agents can include zirconium alkoxides such as ethoxyzirconium stearate, zirconium chelate compounds such as zirconium tetraacetylacetonate and zirconium α-hydroxycarboxylate, zirconium soaps and zirconium acetate.

In the present invention, among these coupling agents, silane coupling agents and titanate coupling agents are preferable from the viewpoint that in the case of using an obtained modified ZWP(2) as a negative thermal expansion filler, these are excellent in dispersibility and adhesiveness to a polymer compound and the effect of more reducing the elution of phosphorus ions from ZWP is large.

The coating amount of the coupling agent in the modified ZWP(2) is preferably 0.05 to 30% by mass and more preferably 0.1 to 10% by mass with respect to the modified ZWP(1). With the coating amount in such a range, the elution of zirconium ions, tungsten ions and phosphorus ions from the modified ZWP are effectively suppressed and the performance as a negative thermal expansion material can be enhanced.

A method of coating a surface of the particle of the modified ZWP(1) with the coupling agent can be carried out by a wet process or a dry process.

In the case where the coating with the coupling agent is carried out by the wet process, the target modified ZWP(2) can be obtained, for example, by immersing the modified ZWP(1) in a dispersion liquid (including a solution) containing the coupling agent in a desired concentration to form a slurry, spray drying or solid-liquid separating the slurry, and drying an obtained solid content to cause the coupling agent to be hydrolyzed and condensed. The concentration of the coupling agent in the dispersion liquid may be suitably regulated so that the coating amount in the modified ZWP(2) falls in the above-mentioned range.

In the case where the coating with the coupling agent is carried out by the dry process, the target modified ZWP(2) can be obtained, for example, by mixing the modified ZWP(1) and the coupling agent by a mixing apparatus such as a Henschel mixer or a pneumatic crusher, or mixing the modified ZWP(1) and a diluted solution of the coupling agent diluted with a solvent, and thereafter, as required, heating the mixture under the above-mentioned conditions to cause the coupling agent to be hydrolyzed and condensed. In the dry process, since the modified ZWP(2) is produced by using the mixture, as it is, of the modified ZWP(1) with the coupling agent, the coating amount of the coupling agent and a value calculated theoretically from the amount thereof charged are substantially the same.

The modified ZWP of the present invention obtained through the above steps can be suitably used as a negative thermal expansive filler for producing a low-thermal expansion material in a dry state of a powder or the like as the modified ZWP is or in a wet state of the powder dispersed in a solvent.

The negative thermal expansion filler of the present invention comprises the modified ZWP, and a polymer composition can be produced by mixing the negative thermal expansion filler and a polymer compound. The polymer composition becomes a material suppressed in the thermal expansion coefficient due to the high negative thermal expansion the modified ZWP has.

The polymer compound to be used for the polymer composition of the present invention is not especially limited, and is preferably a resin or the like having positive thermal expansion. Examples of such a resin include rubber, polyolefin resin, polycycloolefin resin, polystyrene resin, ABS resin, polyacrylate resin, polyphenylene sulfide resin, phenol resin, polyamide resin, polyimide resin, epoxy resin, silicone resin, polycarbonate resin, polyethylene resin, polypropylene resin, polyethylene terephthalate resin (PET resin) and polyvinyl chloride resin. These can be used singly or in combinations of two or more.

The content of the negative thermal expansion filler in the polymer composition can be suitably varied according to kinds of the polymer composition to be used and applications and purposes of a material to be produced, and is preferably 1% by volume to 90% by volume with respect to the polymer composition. Similarly, the content of the polymer compound in the polymer composition is preferably 10% by volume to 99% by volume with respect to the polymer composition.

The polymer composition, in addition to the negative thermal expansion filler and the polymer compound, can further contain additives. Examples of the additives include an antioxidant, a thermal stabilizer, an ultraviolet absorbent, a lubricant, a release agent, a colorant including a dye and a pigment, a flame retardant, a crosslinking agent, a softener, a dispersant, a curing agent, a polymerization initiator and an inorganic filler. The content of the additives is preferably 10% by volume to 90% by volume with respect to the polymer composition.

The polymer composition of the present invention can be produced by a known method. For example, in the case of using a curable resin as the polymer compound, the method includes a method of simultaneously mixing the negative thermal expansion filler, the curable resin (or a prepolymer) and as required, additives to form a molded article, and a method of previously mixing the negative thermal expansion filler and as required additives into one of resin components to make a mixture, and then mixing the mixture with the curable resin (or a prepolymer) to form a molded article.

In the case of using a thermoplastic resin as the polymer compound, the method includes a method of melt mixing the negative thermal expansion filler and the thermoplastic resin by an extruder to form a molded article, and a method of molding a mixture prepared by mixing the negative thermal expansion filler and the thermoplastic resin in a solid state, into a molded article by using an injection molding machine.

The polymer composition of the present invention thus produced is a material effectively suppressed in the thermal expansion coefficient and hardly causing deformation by heat, due to the high negative thermal expansion which the modified ZWP to be used as a negative thermal expansion filler has. Further since there is little the elution of ions from the modified ZWP to be used as a negative thermal expansion filler, the polymer composition can be suitably used, particularly, as a material for precision devices, such as an encapsulant of electronic parts.

EXAMPLES

Hereinafter, the present invention will be described by way of Examples, but the present invention is not any more limited to these Examples.

<Preparation of Zirconium Phosphate Tungstate Particle (ZWP Particle)>
(1. ZWP Particle Sample 1>

15 parts by mass of a commercially available tungsten trioxide ($WO_3$, average particle diameter: 1.2 μm) was placed in a beaker; 84 parts by mass of pure water was further added; and 1 part by mass of a polycarboxylic acid ammonium salt was added as a dispersant to prepare a dispersion liquid. The dispersion liquid was stirred at room temperature (25° C.) for 120 min by using a Three-One Motor stirrer to thereby prepare a 15-mass % slurry containing tungsten trioxide. The average particle diameter of a solid content in the slurry was 1.2 μm.

Then, zirconium hydroxide and a 85-mass % phosphoric acid aqueous solution were added to the slurry at room temperature (25° C.) so that the molar ratio of Zr:W:P in the slurry became 2.00:1.00:2.00 to prepare a reaction liquid. The reaction liquid was reacted at room temperature (25° C.) for 2 hours under stirring. The whole amount of the reaction liquid after the finish of the reaction was dried at 200° C. for 24 hours in the air to thereby obtain a reaction precursor. As a result of subjecting the obtained reaction precursor to X-ray diffraction analysis, only a diffraction peak of tungsten trioxide was observed.

Figure 1:
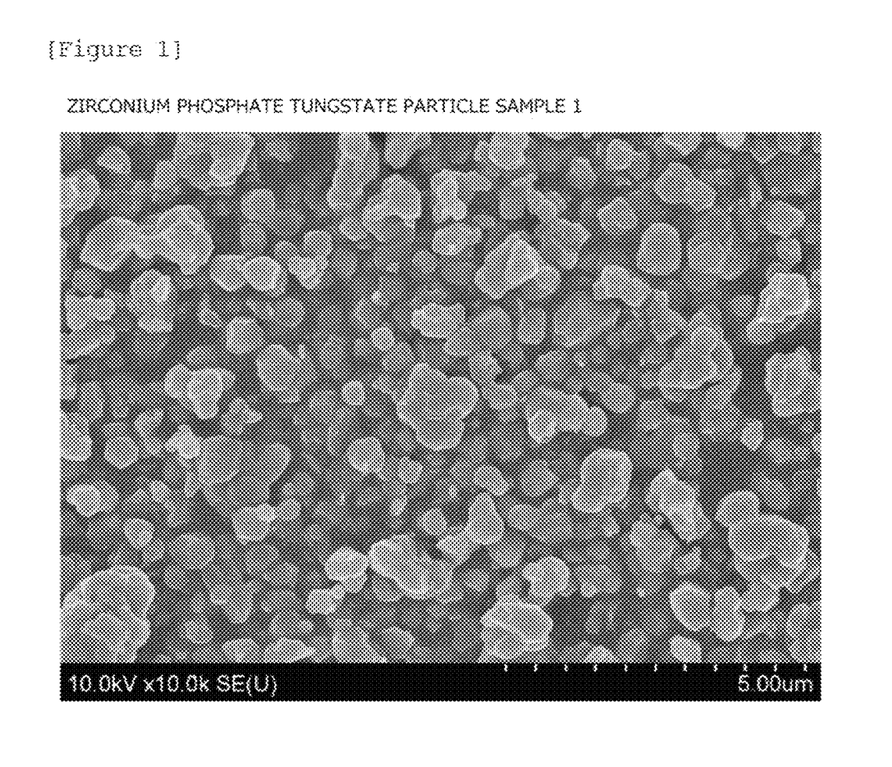
FIG. 1 is a scanning electron microscope image showing shapes of a sample 1 of zirconium phosphate tungstate particles.

Then, the reaction precursor was fired at 950° C. for 2 hours in the air to thereby obtain a white ZWP particle sample 1 as a fired product. The obtained ZWP particle sample 1 was subjected to X-ray diffraction analysis, revealing that the sample 1 was a single-phase $Zr_2(WO_4)(PO_4)_2$. The average particle diameter and the BET specific surface area of the ZWP particle sample 1 are shown in Table 1. As a result of observation by a scanning electron microscope, the particle shape of the obtained ZWP particle sample 1 was a crushed shape as shown in FIG. 1.

(2. ZWP Particle Sample 2>

15 parts by mass of a commercially available tungsten trioxide ($WO_3$, average particle diameter: 1.2 μm) was placed in a beaker; and 84 parts by mass of pure water was further added to prepare a dispersion liquid. The dispersion liquid was stirred at room temperature (25° C.) for 120 min to thereby prepare a 15-mass % slurry containing tungsten trioxide. The average particle diameter of a solid content in the slurry was 1.2 μm.

Then, zirconium hydroxide, a 85-mass % phosphoric acid aqueous solution and magnesium hydroxide were added to the slurry at room temperature (25° C.) so that the molar ratio of Zr:W:P:Mg in the slurry became 2.00:1.00:2.00:0.1 to prepare a reaction liquid. The reaction liquid was heated to 80° C. and reacted for 4 hours under stirring. Thereafter, to the reaction liquid after the finish of the reaction, 1 part by mass of a polycarboxylic acid ammonium salt was added as a dispersant; and under stirring, the resultant was fed to a media dispersing-type bead mill (LMZ2, manufactured by Ashizawa Finetech Ltd.) with zirconium beads of 0.5 mm in diameter, and wet crushed at 2,000 rpm for 15 min. The average particle diameter of a solid content in the reaction liquid after the wet crushing was 0.3 μm.

Then, the reaction liquid after the wet crushing was fed to a spray dryer set at 220° C. at a feed rate of 2.4 L/h to thereby obtain a reaction precursor. As a result of subjecting the obtained reaction precursor to X-ray diffraction analysis, only a diffraction peak of tungsten trioxide was observed.

Figure 2:
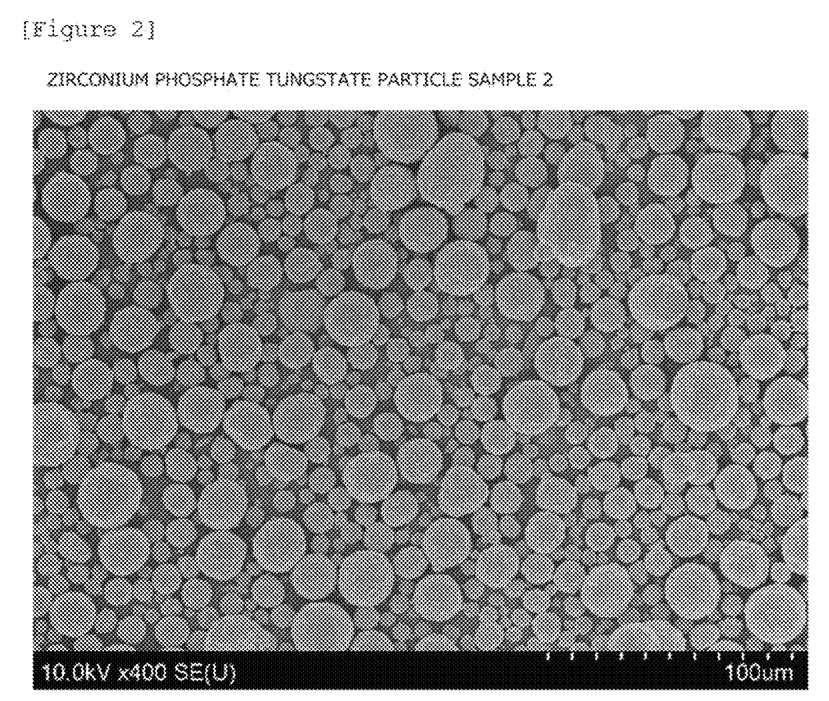
FIG. 2 is a scanning electron microscope image showing shapes of a sample 2 of zirconium phosphate tungstate particles.

Finally, the obtained reaction precursor was fired at 960° C. for 2 hours in the air to thereby obtain a white ZWP particle sample 2 as a fired product. The obtained ZWP particle sample 2 was subjected to X-ray diffraction analysis, revealing that the sample 2 was a single-phase $Zr_2(WO_4)(PO_4)_2$. The average particle diameter and the BET specific surface area of the ZWP particle sample 2 are shown in Table 1. As a result of observation by a scanning electron microscope, the particle shape of the obtained ZWP particle sample 2 was spherical as shown in FIG. 2.

TABLE 1

|  | Particle shape | Average particle diameter (μm) | BET specific surface area ($m^2/g$) |
| --- | --- | --- | --- |
| ZWP particle sample 1 | crushed shape | 0.6 | 3.82 |
| ZWP particle sample 2 | spherical | 16 | 0.5 |

Example 1

50 g of the ZWP particle sample 1 and 3.5 g of a 40-mass % zinc nitrate aqueous solution prepared by using zinc nitrate hexahydrate were crushed and mixed by a pneumatic crusher (A-O Jet Mill, manufactured by Seishin Enterprise Co., Ltd.) to prepare a powder mixture; and the mixture was heated at 400° C. in the air atmosphere for 1 hour to thereby obtain a modified ZWP coated with zinc oxide on the surface of the ZWP particle. The modified ZWP was a particle in a crushed shape. The conditions of the pneumatic crusher were set at: a powder feed rate of 3 g/min; a pusher pressure of 0.6 MPa; and a jet pressure of 0.6 MPa.

Figure 3:
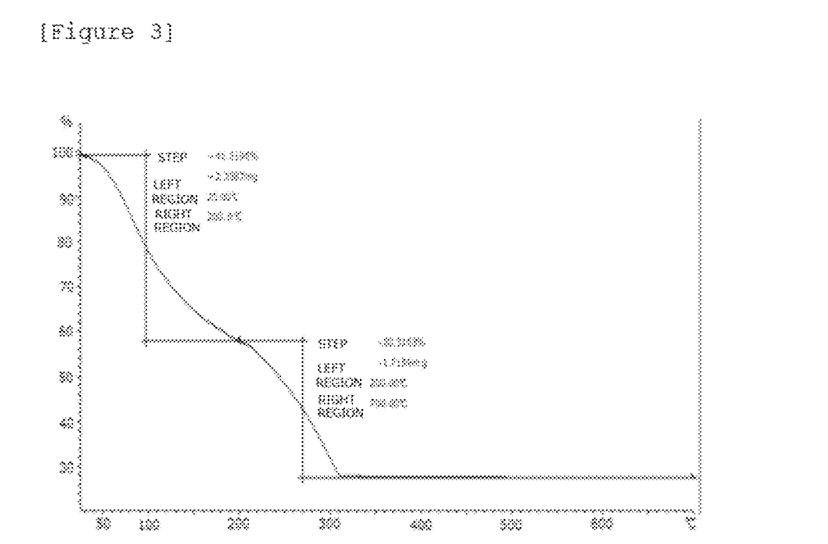
FIG. 3 is a TG curve of a zinc nitrate hexahydrate.

With regard to the zinc nitrate hexahydrate used, a TG curve measured by the following method is shown in FIG. 3. As indicated in the TG curve of FIG. 3, it is found that the zinc nitrate hexahydrate (molecular weight: 297.49) was decomposed and turned to zinc oxide (molecular weight: 81.40) at 310° C.

Therefore, it is found that zinc nitrate present on the surface of the ZWP particle was converted to zinc oxide by the heat treatment at 400° C.

<Measurement Method of TG Curve>

There was determined the TG curve in the air atmosphere from 25° C. to 700° C. at a temperature-rise rate of 10° C./min. The amount of sample was set at 5.6 mg.

Example 2

A modified ZWP coated with zinc oxide on the surface of the ZWP particle was obtained by the same method as in Example 1, except for using 1.63 g of a zinc citrate dihydrate powder in place of 3.5 g of a 40-mass % zinc nitrate aqueous solution, and altering the temperature of the heat treatment of the power mixture to 430° C. The modified ZWP was a particle in a crushed shape.

Figure 4:
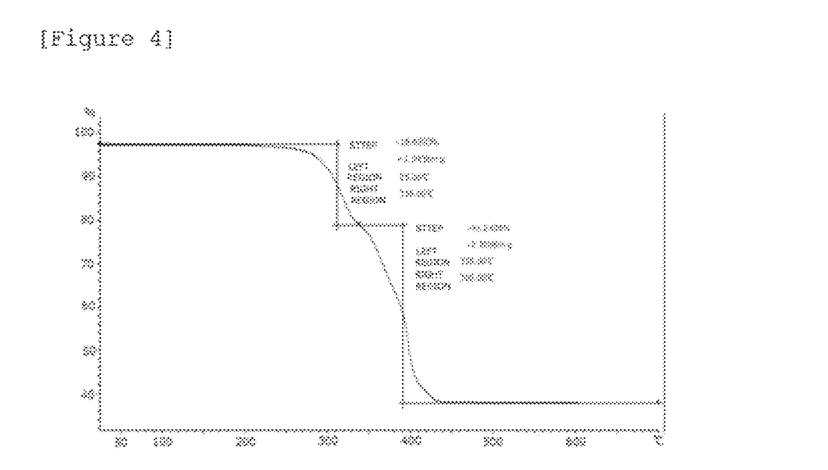
FIG. 4 is a TG curve of a zinc citrate dihydrate.

With regard to the zinc citrate dihydrate used, a TG curve measured by the same method as above is shown in FIG. 4. As indicated in the TG curve of FIG. 4, it is found that the zinc citrate dihydrate (molecular weight: 610.43) was decomposed and turned to zinc oxide (molecular weight: 81.40) at 430° C.

Therefore, it is found that zinc citrate dihydrate present on the surface of the ZWP particle was converted to zinc oxide by the heat treatment at 430° C.

Example 3

50 g of the ZWP particle sample 2 and 1.63 g of a zinc citrate dihydrate powder were added and mixed at 20,000 rpm for 1 min by a mixer (a laboratory mixer, Labo Milser) to prepare a powder mixture; and the mixture was heated in the air atmosphere at 430° C. for 30 min to thereby obtain a modified ZWP coated with zinc oxide on the surface of the ZWP particle. The modified ZWP was a spherical particle.

Comparative Examples 1 and 2

The ZWP particle sample 1 alone was used as Comparative Example 1; and the ZWP particle sample 2 alone was used as Comparative Example 2. That is, each Comparative Example used the ZWP particle alone and had no coating of the surface of the particle with a zinc compound.

<Evaluations of Physical Properties>

(Evaluation of Thermal Expansion Coefficient of Powders)

The particles obtained in the Examples and the Comparative Examples were each heated in an XRD apparatus having a temperature rising function (Ultima IV, manufactured by Rigaku Corp.), at a temperature-rise rate of 20° C./min from 25° C. to a target temperature set at 100° C.; and at 10 min after the target temperature was reached, the a-axis, b-axis and c-axis lattice constants of the sample were measured. Then, the target temperature was successively raised to 200° C., 300° C. and 400° C.; and the a-axis, b-axis and c-axis lattice constants of the sample were measured at the respective temperatures by the same method as above. The thermal expansion coefficient (ppm/° C.) was determined by linearly converting obtained changes in the lattice volume (rectangular parallelepiped)(see J. Mat. Sci., (2000), 35, pp. 2451-2454). The results are shown in Table 2.

(Evaluation of the Amount of P Ions Eluted)

1 g of the particle obtained in the Examples and the Comparative Examples each was added to 70 mL of pure water to prepare a test liquid; and the test liquid was heated at 85° C. for 1 hour, thereafter cooled to room temperature (25° C.), and diluted with pure water so as to be 100 mL. The resultant test liquid was allowed to stand at 25° C. for 24 hours, and thereafter solid-liquid separated by filtration; and the total amount of P ions in the filtrate was measured by an ICP atomic emission spectrometer, and converted to a total amount of P ions eluted per g of the modified ZWP; and the results are shown in Table 2.

of the modified ZWP, 3.3 g of a spherical fused silica (average particle diameter: 10 μm, linear expansion coefficient: $5\times10^{-7}$/° C.) as a negative thermal expansion filler to fabricate a 30-vol % paste. A cross section of the obtained polymer composition was observed by a scanning electron microscope, and it was confirmed that the spherical fused silica was dispersed homogeneously in the polymer composition.

<Evaluation of Thermal Expansion Coefficient of Compositions>

The polymer compositions obtained in the Examples and the Reference Example were each cut out into a rectangular parallelepiped of 5 mm×5 mm×10 mm to prepare a measurement sample. For the measurement sample, the linear expansion coefficient between 30° C. and 120° C. was measured at a temperature-rise rate of 1° C./min by using a thermomechanical analyzer (TMA: 4000SE, manufactured by NETZSCH-Geratebau GmbH). The results are shown in Table 3.

TABLE 2

| | ZWP particle | Average particle diameter (μm) | BET specific surface area (m²/g) | [1] Coating amount of zinc compound (% by mass) | Temperature of heat treatment (° C.) | Linear expansion coefficient of powder (ppm/° C.) | [2] Total amount of P ions eluted (μg/g) |
|---|---|---|---|---|---|---|---|
| Example 1 | Sample 1 | 0.6 | 3.91 | 1.0 | 400 | −3 | 10 |
| Example 2 | Sample 1 | 0.6 | 3.95 | 1.0 | 430 | −3 | 50 |
| Example 3 | Sample 2 | 16 | 0.5 | 1.0 | 430 | −3 | 10 |
| Comparative Example 1 | Sample 1 | — | — | — | — | −3 | 130 |
| Comparative Example 2 | Sample 2 | — | — | — | — | −3 | 124 |

Note:
[1] indicates a coating amount in terms of Zn atom.
[2] indicates a total amount of P ions eluted per g of modified ZWP.

As shown in Table 2, it is clear that the modified ZWP of each Example, as compared with the particle of each Comparative Example, had a negative thermal expansion coefficient at the same level, and simultaneously suppressed the elution of ions from the particle.

Examples 4 to 6

By using the modified ZWPs obtained in Examples 1 to 3 as negative thermal expansion fillers, polymer compositions were produced, respectively. In detail, 5.8 g of the negative thermal expansion filler and 4.2 g of epoxy resin (jER807, epoxy equivalent: 160 to 175, manufactured by Mitsubishi Chemical Corp.) as a polymer compound were mixed at a rotating speed of 2,000 rpm by using a vacuum mixer (Awatori Rentaro ARV-310, manufactured by Thinky Corp.) to thereby fabricate 30-vol % pastes.

Then, 100 μL of a curing agent (Curezol, manufactured by Shikoku Chemicals Corp.) was added to each paste, mixed at a rotating speed of 1,500 rpm by using the vacuum mixer, and cured at 150° C. over 1 hour to thereby obtain target polymer compositions. Cross sections of the obtained polymer compositions were observed by a scanning electron microscope, and it was confirmed that in each Example, the modified ZWP being the negative thermal expansion filler was dispersed homogeneously in the polymer composition.

Reference Example 1

A target polymer composition was obtained by the same method as in Example 6, except for using, in place of 5.8 g

TABLE 3

| | Negative thermal expansion filler | Linear expansion coefficient (/° C.) |
|---|---|---|
| Example 4 | Example 1 | $30 \times 10^{-6}$ |
| Example 5 | Example 2 | $30 \times 10^{-6}$ |
| Example 6 | Example 3 | $30 \times 10^{-6}$ |
| Reference Example 1 | Fused silica | $40 \times 10^{-6}$ |

As shown in Table 3, it is clear that the polymer composition of each Example using the modified ZWP of the present invention as a negative thermal expansion filler was a material having a low linear expansion coefficient and hardly causing deformation by heat.

Example 7

0.75 g of a titanate coupling agent (isopropyl triisostearoyltitanate) was added to 50 g of the modified ZWP (modified ZWP(1)) obtained in Example 1, and crushed and mixed by a pneumatic crusher (A-O Jet Mill, manufactured by Seishin Enterprise Co., Ltd.) to prepare a powder mixture, and the mixture was heated at 110° C. in the air atmosphere for 4 hours to thereby obtain a modified ZWP(2) sample coated with the titanate coupling agent on the surface of the modified ZWP particle. The modified ZWP(2) sample was a particle in a crushed shape. The conditions of the pneumatic crusher were set at: a powder feed rate of 3 g/min; a pusher pressure of 0.6 MPa; and a jet pressure of 0.6 MPa.

Further the amount of P ions eluted from the obtained modified ZWP(2) sample was measured in the same manner as in Examples 1 to 3. The result is shown in Table 4.

Example 8

0.75 g of a silane coupling agent (3-glycidoxypropyltrimethoxysilane) was added to 50 g of the modified ZWP (modified ZWP(1)) obtained in Example 1, and crushed and mixed by a pneumatic crusher (A-O Jet Mill, manufactured by Seishin Enterprise Co., Ltd.) to prepare a powder mixture, and the mixture was heated at 110° C. in the air atmosphere for 4 hours to thereby obtain a modified ZWP(2) sample coated with the silane coupling agent on the surface of the modified ZWP particle. The modified ZWP(2) sample was a particle in a crushed shape. The conditions of the pneumatic crusher were set at: a powder feed rate of 3 g/min; a pusher pressure of 0.6 MPa; and a jet pressure of 0.6 MPa.

Further the amount of P ions eluted from the obtained modified ZWP(2) sample was measured in the same manner as in Examples 1 to 3. The result is shown in Table 4.

TABLE 4

| | Modified ZWP(1) | Kind of coupling agent | Coating amount of coupling agent (% by mass) | Total amount of P ions eluted (μg/g) |
|---|---|---|---|---|
| Example 7 | Example 1 | titanate coupling agent | 1.5 | 5 |
| Example 8 | Example 1 | silane coupling agent | 1.5 | 3 | note)
Coating amount of coupling agent is indicated as an amount of the coupling agent added to modified ZWP(1).

As shown in Table 4, it is clear that the modified ZWP(2) further having been subjected to the coupling agent treatment more suppressed the elution of ions from the particle.

Examples 9 and 10

By using, as negative thermal expansion fillers, the modified ZWP(2) samples obtained in Examples 7 and 8, polymer compositions were produced, respectively. In detail, 5.8 g of the negative thermal expansion filler and 4.2 g of epoxy resin (jER807, epoxy equivalent: 160 to 175, manufactured by Mitsubishi Chemical Corp.) as a polymer compound were mixed at a rotating speed of 2,000 rpm by using a vacuum mixer (Awatori Rentaro ARV-310, manufactured by Thinky Corp.) to thereby fabricate 30-vol % pastes.

Then, 100 μL of a curing agent (Curezol, manufactured by Shikoku Chemicals Corp.) was added to each paste, mixed at a rotating speed of 1,500 rpm by using the vacuum mixer, and cured at 150° C. over 1 hour to thereby obtain target polymer compositions. Cross sections of the obtained polymer compositions were observed by a scanning electron microscope, and it was confirmed that in each Example, the modified ZWP(2) sample being the negative thermal expansion filler was dispersed homogeneously in the polymer composition.

<Evaluation of Thermal Expansion Coefficient of Compositions>

The polymer compositions obtained in Examples 9 and 10 were each cut out into a rectangular parallelepiped of 5 mm×5 mm×10 mm to prepare a measurement sample. For the measurement sample, the linear expansion coefficient between 30° C. and 120° C. was measured at a temperature-rise rate of 1° C./min by using a thermomechanical analyzer (TMA: 4000SE, manufactured by NETZSCH-Geratebau GmbH). The results are shown in Table 5.

TABLE 5

| | Negative thermal expansion filler | Linear expansion coefficient (/° C.) |
|---|---|---|
| Example 9 | Example 7 | $30 \times 10^{-6}$ |
| Example 10 | Example 8 | $30 \times 10^{-6}$ |

As shown in Table 5, it is clear that the polymer composition of each Example using the modified ZWP(2) of the present invention as a negative thermal expansion filler was a material having a low linear expansion coefficient and hardly causing deformation by heat.

The invention claimed is:

1. A modified zirconium phosphate tungstate, wherein a surface of a zirconium phosphate tungstate particle is coated with an inorganic compound containing one or two or more elements (M) selected from Zn, Si, Al, Ba, Ca, Mg, Ti, V, Sn, Co, Fe and Zr,
   wherein an amount of phosphorus ions eluted when 1 g of the modified zirconium phosphate tungstate is heated in 70 mL of water at 85° C. for 1 hour, then cooled to 25° C. and allowed to stand for 24 hours is 100 μg or smaller per g of the modified zirconium phosphate tungstate, and
   wherein a coating amount of the inorganic compound in terms of the element (M) contained in the inorganic compound with respect to the particle is 0.1% by mass to 10% by mass.

2. The modified zirconium phosphate tungstate according to claim 1, wherein the particle has a BET specific surface area of 0.1 m$^2$/g to 50 m$^2$/g.

3. The modified zirconium phosphate tungstate according to claim 1, wherein the particle has an average particle diameter of 0.02 μm to 50 μm.

4. The modified zirconium phosphate tungstate according to claim 1, wherein the particle further comprises a subcomponent element.

5. The modified zirconium phosphate tungstate according to claim 1, wherein the inorganic compound is an oxide and/or a hydroxide containing the element (M).

6. The modified zirconium phosphate tungstate according to claim 5, wherein the element (M) is Zn.

7. The modified zirconium phosphate tungstate according to claim 1, wherein, further, a surface of the particle is coated with a coupling agent.

8. The modified zirconium phosphate tungstate according to claim 7, wherein the coupling agent is a silane coupling agent or a titanate coupling agent.

9. A negative thermal expansion filler comprising the modified zirconium phosphate tungstate according to claim 1.

10. A polymer composition comprising the negative thermal expansion filler according to claim 9 and a polymer compound.

11. A modified zirconium phosphate tungstate, wherein a surface of a zirconium phosphate tungstate particle is coated with an inorganic compound,
    wherein an amount of phosphorus ions eluted when 1 g of the modified zirconium phosphate tungstate is heated in 70 mL of water at 85° C. for 1 hour, then cooled to 25°

C. and allowed to stand for 24 hours is 100 μg or smaller per g of the modified zirconium phosphate tungstate, and wherein the inorganic compound is an oxide and/or a hydroxide containing the element (M), wherein the element (M) is Zn.

12. A negative thermal expansion filler comprising the modified zirconium phosphate tungstate according to claim 11.

13. A polymer composition comprising the negative thermal expansion filler according to claim 12 and a polymer compound.

* * * * *